Jan. 14, 1936.    R. R. RIDGWAY ET AL    2,027,788
BEARING
Filed March 8, 1934
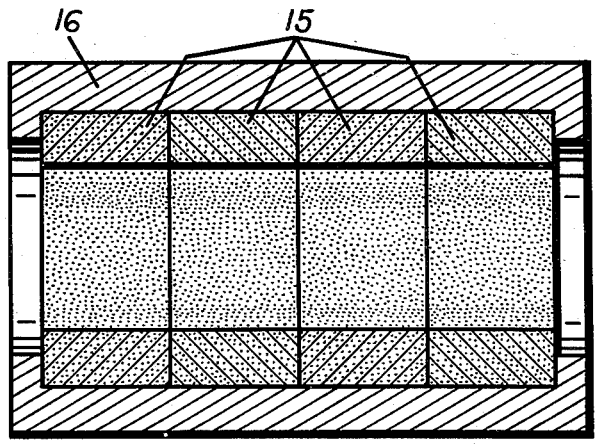
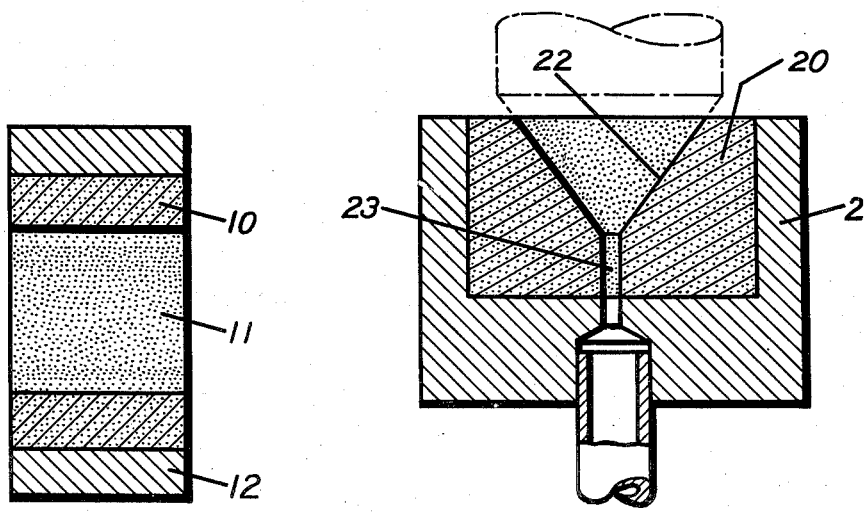
WITNESSES
Franklin E. Johnson
W R Greenwood
Inventors
RAYMOND R. RIDGWAY
BRUCE L. BAILEY
By Clayton L. Jenks
Attorney Patented Jan. 14, 1936

2,027,788

UNITED STATES PATENT OFFICE 2,027,788

BEARING

Raymond R. Ridgway and Bruce L. Bailey, Niagara Falls, N. Y., assignors to Norton Company, Worcester, Mass., a corporation of Massachusetts Application March 8, 1934, Serial No. 714,680

5 Claims. (Cl. 308—242)

This invention relates to bearings, and more particularly to a bearing having a high degree of hardness and wear resistance which is particularly adapted for use as a bearing jewel for supporting oscillating and rotating parts in various instruments of precision, and for bushings, step-bearings and the like to be used for bearing surfaces in machines of all types where great hardness and wear resistance are required.

Heretofore, it has been customary to support the delicate pivots and oscillating parts of instruments of precision, clock mechanisms and the like, with natural gem materials, such as diamonds and sapphires, which have been drilled and polished to act as bearing supports. Although the extreme hardness of these materials has made them especially applicable for such purposes, the gems are expensive, and due to this high cost, their use has been mainly limited to the field of precision instruments.

Various synthetic materials have been tried from time to time as a substitute for the natural stones, but they have been found to be unsatisfactory, owing to such objections as lack of suitable hardness or wear resistance for the uses intended; lack of uniform hardness throughout the body, thereby permitting unequal wear on the bearing surfaces and causing injury or destruction of the supported pivots and journals, due to the development of myriads of cutting points on the faces of the supporting surface arising from such conditions of unequal wear; lack of sufficient density of the material to prevent a cutting action resulting from the pore clearances on the bearing surfaces; and expensiveness of manufacture as compared with the cost of the natural stones.

It is, therefore, apparent that if a bearing is to be made up of very hard, wear-resistant material, it must be absolutely uniform in the physical characteristics of hardness and wear resistance, and it must be free from structural defects, such as pores and fissures. Because of these limitations, no synthetic material of unusual hardness has ever replaced the natural gem stones, such as the sapphire and the diamond, for bearing purposes. Efforts have been made heretofore to use crystals of fused crystalline alumina and silicon carbide as crystal bearings. These materials, however, have not been bonded into bodies of sufficient density or hardness to be suitable for use in large bearing structures, and on the other hand, they are not grown in single crystals which are large enough to be substituted for the natural gem materials.

It is accordingly the primary object of the invention to overcome these difficulties heretofore encountered and to provide a bearing embodying a synthetic material of high hardness and resistance to abrasion which will possess the desirable properties of the natural stones and have long useful life and be capable of withstanding rapid destruction when in use, and which will also present a surface capable of taking an exceptionally high polish where such polish is desirable.

With this and other objects in view, as will be apparent in the following disclosure, the invention resides in the combination of parts and the steps of the process set forth in the specification and covered by the claims appended hereto.

The present invention contemplates the provision of an improved bearing material composed of boron carbide of the formula $B_4C$, or as made in accordance with the method described in the patent to Ridgway No. 1,897,214 of February 14, 1933. This boron carbide material is characterized by a hardness which is greater than that of the standard abrasive materials, such as crystalline alumina and silicon carbide, and it approaches the hardness of the diamond. It is a further characteristic of the boron carbide, as described, that it can be molded and cast at high temperatures to form a dense, homogeneous mass having a single continuous crystalline phase of boron carbide of a uniform degree of hardness which is without intergranular weakness and shows a fracture of glassy conchoidal texture.

The material is particularly characterized by having a purity in excess of 99% of $B_4C$ and its being devoid of parting planes of graphite and uncombined carbon, and it is undiluted by appreciable amounts of foreign and undesired impurities, such as borides and carbides of iron, aluminum, silicon and other metals. It has a very high melting point of about 2400±50° C. and probably melts at about 2375° C., as measured by optical methods. The boron carbide is very stable and is not decomposed at the furnace operating temperature, and in particular it does not vaporize in the manner in which boron metal does, but it melts to a liquid phase and crystallizes therefrom so that it is capable of being formed and cast into a molded shape. Hence, it is, therefore, an excellent material for bearing uses and it is particularly suited thereto due to its superior abrasion resistance and durable wearing qualities, and when suitably mounted and supported it possesses high resistance to the crushing strains which result during its use. Furthermore, this dense material being of a monophase structure and free from pores thus is particularly adapted for bearing purposes due to its freedom from minute abrasive points or edges, which would act to abrade or score the rotatable or oscillatable body which it supports when placed in direct wearing engagement therewith.

In the practice of this invention, the bearing is preferably so made that its effective bearing surface comprises boron carbide of the composition $B_4C$, as above described. It is here contemplated, therefore, to make the entire bearing of the boron carbide composition or it may be desirable to make the main body of the bearing of cast iron, steel or other suitable metal and to fit into it wearing surfaces of the boron carbide in the form of shaped linings made of the material.

In carrying out the present invention, boron carbide $B_4C$, as made in accordance with the above-mentioned Ridgway patent, is formed into molded articles suitable as bearings by the method disclosed in the copending application of Ridgway and Bailey, Serial No. 694,502, filed October 20, 1933, the boron carbide material being molded or cast under heat and pressure into suitable shapes of high density and having a substantially continuous crystalline mono-phase structure. The boron carbide is employed in a finely divided condition and, without the addition or presence of bonding materials or cementing matrices of a lower degree of hardness, is placed in a mold of suitable refractory material, such as graphite. The mold and its contents is heated in accordance with high pressure furnacing conditions which cause the boron carbide to be melted or softened and be shaped under pressure while in a semi-plastic or molten condition to the mold form, where it is then crystallized and solidified therein into a single-phase, crystalline, self-bonded body of a density of from 2.3 to 2.55 grams per cubic centimeter. The molding process is preferably carried on in the presence of an inert atmosphere or in the absence of oxygen or other substances which cause oxidation or decomposition of the boron carbide. The temperature may be between 2200 and 2450° C., depending upon the nature of the material used and the size and density of the finished product intended. The high temperature conditions are so maintained as to prevent the $B_4C$ material from reacting chemically with or physically dissolving foreign substances capable of detrimentally affecting its properties.

The forming process is preferably so carried on that the molded body is not contaminated in particular with substantial amounts of dissolved graphite and does not contain parting planes of graphite within its mass and which, therefore, has great strength, density and rigidity as well as hardness. Hence, due to the ease with which molten boron carbide tends to dissolve graphite, the forming operation may be arranged so that material is heated to a softened condition and caused to be shaped while it is too viscous, or insufficiently heated, to dissolve or react with the graphite mold parts to any detrimental extent. However, if the material is fully melted so as to become completely fluid, it is necessary then that it be rapidly cooled soon after it has become molten to a temperature at which it is stable or sufficiently cooled to become shaped by the graphite mold. In this way, the molten material is permitted to remain in contact with the graphite parts only for the minimum of time required for it to become shaped by the mold under the conditions of the molding or casting operation. Experimental tests have indicated that liquefaction, or softening of the boron carbide powder, may be brought about at a temperature appreciably below its melting point when it is subjected to a high pressure. Under such conditions of temperature and pressure, liquefaction of the compound may be obtained without the solution or absorption of more carbon than is necessary to produce the form of boron carbide of the composition of $B_4C$, as set forth in the Ridgway patent. In this case, the material is also observed to crystallize again when the molding pressure is released, even though the temperature is held constant.

It is found that by a careful regulation of the composition of boron and carbon during the synthesis of the mass, a product can be made which consists entirely of the crystalline compound $B_4C$ which is intergrown in crystals of microscopic dimensions, so that a surface may be polished upon the formed piece which is glass-like and continuous. It also is found that the polish which can be imparted to the surface of the boron carbide material is comparable in quality to that which may be applied to the natural gem stones.

As a result of the boron carbide bearing material being of a crystalline nature and of a high degree of hardness, it is somewhat brittle in character. This necessitates a careful mounting of the bearing body in a suitable rigid support or a protective casing capable of resisting shock or other mechanical violence and adapted to take up the crushing strains and thrust induced in the boron carbide body incident to the rotation of the spindle. The bearing should be so mounted in the casing so as to insure that the spindle therein does not bear on or be supported unevenly, but that the forces and pressures exerted on the bearing surface be equally applied throughout the extent of the supporting surface. It will be apparent to those skilled in the art that care must be taken to insure that the casing material is thus equally and smoothly applied to the carbide body and that it has such physical characteristics under heat and pressure that it will continuously act to support the carbide material in all types of severe operations and act to protect the bearing against abusive treatment. For this purpose, a metal alloy, such as nickel steel, is particularly suited to provide sufficient rigidity against pressures which tend to stress the carbide material and also serves to insure proper alignment of the rotatable shaft therein.

The invention will be more clearly understood from the following description in conjunction with the accompanying drawing, in which:

Fig. 1 is a longitudinal sectional view of a journal bearing embodying the invention and mounted in a reinforcing casing;

Fig. 2 is a longitudinal sectional view of a modified construction of a journal bearing embodying the invention and illustrating the method of producing a long bearing surface; and Fig. 3 is a sectional view of a step-bearing embodying the invention and mounted in a reinforcing casing.

In one embodiment of the invention, as illustrated in Fig. 1 of the drawing, a bearing sleeve or ring 10 composed of dense, homogeneous boron carbide $B_4C$, as described, and provided with a central cylindrical bore 11 for the spindle journal, is rigidly mounted in a backing shell or reinforcing casing 12 of a suitable metal, such as steel or a nickel alloy. The bearing bore 11 may be initially formed in the boron carbide body during the pressure casting operation, or it may later be drilled therein by suitable means after a solid body has been cast. If the latter practice is employed, a depression may be shaped in one or both faces of the carbide body during the casting operation and thereafter crystals of boron carbide from a previous operation, or preferably diamond abrasive powder or dust, may be employed with rotary iron drills in accordance with the standard practice of drilling diamonds to form a hole between the formed depressions. In the pressure molding method of forming an opening in the article, a refractory core of suitable size may be employed in the mold to shape the internal bearing surface, and in certain cases a hole of smaller dimensions than ultimately required may be formed during the pressure molding operation and the hole thereafter enlarged and finished by means of a suitable diamond drilling operation to the desired size and shape required to properly support the spindle journal.

The casing 12 is provided with a bore, the inside diameter of which is made accurately to the correct outer dimensions of the carbide bearing 10, and it is then heated and shrunk upon cooling over the carbide bearing ring 10, whereby it is held rigidly thereto. If desired, one also may employ a procedure in which the boron carbide bearing is first made smooth as possible, as by a suitable polishing operation, after which it is electroplated with a suitable metal, such as a heavy coating of copper, and the coated body thereafter set in place in the metal holder while in a hydrogen atmosphere, as by heating and shrinking the holder thereon. Other methods of mounting the boron carbide bearings are feasible, such as by copper brazing, cementing or by the use of solder sweated in place in holder made of nickel alloy.

To illustrate one particular manner of making the bearing ring 10, a definite weighed amount of this boron carbide powder, as predetermined by suitable calculations, and of a high degree of purity and having a composition of boron and carbon of the ratio of $B_4C$, as is obtained in accordance with the process set forth in the Ridgeway patent, is placed in a graphite mold and subjected to pressure while it is heated to a point at which it becomes molten or sufficiently soft to become shaped by the mold, the pressure being sufficiently high to consolidate or cause coalescence of the carbide particles into a structure of the required density and other characteristics. The material may be preliminarily pressed to shape in the mold or it may be shaped prior to its being placed therein so that it will have an apparent density of about 2.0, thus lessening the extent of the plunger movement during the pressure casting operation. To attain the maximum apparent density and so avoid large plunger movements, a boron carbide powder having a particle size not greater than will be retained on a screen having 200 meshes to the linear inch is preferably used. If coarse grains are used, with the resulting large intergranular spaces, a much larger applied pressure is required to produce the maximum density than when fine sizes are employed. A fixed sizing of the grains may also be used so that a definite volume-weight relationship exists in the material to be fused into a dense mass. If such a powder of pure boron carbide is employed, the apparent density may be raised to a value substantially equal to or within 2% of the real density of boron carbide, which is about 2.52. Also, if necessary, the carbide grains may be subjected to suitable chemical treatment, as set forth in the aforesaid Ridgway and Bailey application, to remove any chemically reactive constituents from the finely divided powder in order that a substantially chemically pure boron carbide may be obtained.

In carrying out the pressure molding operation, a non-reactive refractory material should be utilized for the mold or container for the molten carbide, and commercial graphite of the purest quality and which has a strong non-porous form and has been processed to give a maximum density, such as is used as an electric furnace electrode, is found to be a practical material for such purposes. This graphite is well known in the electrometallurgical art and consists essentially of pure carbon with only negligible amounts of ash constituents.

The molding apparatus employed is preferably one which is equipped with a movable graphite plunger slidably fitted into the mold so that by applying pressure to the plunger, it is possible to follow the conversion of the solid carbide grain to the softened or molten stage as the material is raised to the specified temperature, and when fusion or coalescence takes place the plunger movement will then serve to indicate the total consolidation of the boron carbide grains therein. As soon as this plunger indication is observed, the mold with its shaped contents is then immediately cooled to solidify the boron carbide.

The amount of pressure to be applied to the material in the mold will be determined in accordance with the size and desired density of the boron carbide bearings to be made. In practice, the pressure limits may be maintained within a range of from 100 to 5000 lbs. per square inch to produce articles of the highest quality. These pressure limits will, of course, be governed largely by the strength of the mold parts and the furnace materials employed. In practice, the ordinary frictional losses are abnormally high in proportion to the total force applied. Hence, during the forming process there is a tendency for the powder in the mold to pack and resist or neutralize the pressure applied to the plunger due to friction along the side of the mold. In such cases, accuracy and success of the molding operation depend upon the use of a sufficiently high pressure to overcome this effect and also require a smooth and highly polished mold surface. Thus, in the manufacture of bearings of the highest quality, the highest pressure which is consistent with the strength of the plunger and mold parts should be utilized. Bearings, as made in the manner thus described, present a working surface which is smooth, even and of a metallike appearance capable of taking a high polish, and have a modulus of rupture in compression in excess of 100,000 lbs. per square inch.

It has not definitely been proved, but it may be conveniently assumed that the pressure applied to the plunger during the pressure molding operation may also serve to lower the fusion point of the boron carbide grain to a point where the rate of solution of carbon from the containing walls is greatly reduced, thereby making possible the production of the fused article without the inclusion of excess graphite. However, by applying sufficient pressure to insure the required density of product, and by carefully limiting the temperature so as to reduce it below the melting point as soon as the material has been sufficiently heated to shape it to the mold, a boron carbide article may be made which has not dissolved material amounts of carbon from the graphite mold. If desired, the plunger movement during the moulding operation may be so controlled that a definite amount or weight of grains which has been calculated to occupy a desired volume precentage of the final product will be caused to occupy that volume in the shaped body, so that the porosity will likewise constitute a desired volume. Also, rates of cooling, variations of temperature, pressure, length of the heating period, and the original grain size of the boron carbide powder all serve to influence the structure of the resultant formed article, and their control are all within the skill of one familiar with this art.

It also has been found that in the manufacture of the carbide compound, particular care should be taken to avoid the presence of free boron in the boron carbide powder, since in the process of preheating carbide powder prior to the forming operation, if free boron is present it will pick up nitrogen from the surrounding furnace atmosphere. Also, when the carbide powder is later molded near its melting point, the carbon vapor which is evolved from the mold body and the furnace atmosphere reacts with this boron nitride to set free nitrogen in accordance with the well-known chemical reaction. Although this replacement of nitrogen with carbon tends to improve the quality of the final article, it acts to liberate tiny bubbles of gas throughout the plastic or molten carbide. While the process is designed to allow the escape of these bubbles, it has been found that for the production of products of the highest quality, such as required for bearing uses, this reaction must be avoided or prevented as much as possible. Accordingly, there is used in the preferred practice of the invention for the production of bearings, a powder which is exactly according to the composition of $B_4C$ so that the final formed article will consist entirely of boron carbide of the formula $B_4C$ plus a trace of graphite. For mechanical uses, the graphite content in the boron carbide compound must not exceed a very small trace, since the occurrence of extra graphite weakens the physical structure of the molded article. For bearing purposes, a trace of graphite is not objectionable, while the trace of porosity which results from the presence of separated nitrogen in the furnace reaction is highly objectionable. Hence, it is a preferable practice in carrying out this process that for the composition to be maintained slightly on the carbon-rich side of the specified composition is desirable.

Furthermore, it is found in the production of bearings that a superior article may be produced when the molding is so conducted that the limit of the ratio of length to cross-sectional area of the molded piece is as small as possible. For the highest quality product, the outside diameter of the bearing ring should be from four to five times its length. However, when the ring section of the bearing is approximately equi-dimensional, very high quality bearings are produced.

In the modified construction illustrated in Fig. 2, a series of boron carbide rings 15 of the composition $B_4C$ and made in the manner previously described with reference to the construction shown in Fig. 1 are mounted axially in a casing 16 to form a single bearing surface, where a large area of support is desirable in certain types of machines. The casing 16 may be formed around the ring assembly by a suitable die casting process, in accordance with the standard practice in the art, whereby the molten metal is forced under high pressure into a suitable mold which is accurately made to the size and shape of the casting desired. The material employed for the casing 16 may comprise the standard metals generally used for die-castings, and in particular those alloys which have considerable tensile and compressive strength, such as the copper-aluminum alloys and the zinc-base alloys.

As illustrated in Fig. 3, a step-bearing construction is shown comprising a bearing block 20 composed of boron carbide $B_4C$, as previously described, which is rigidly mounted in a metal casing 21 made of steel or a nickel alloy. The carbide block 20 is provided with a conical recess 22 which forms the bearing surface for supporting a pivot or conical pointed shaft, as shown in dotted outline. The pivot recess 22 may be lubricated in any suitable manner, as by an axial hole 23 which may be connected to the standard arrangements adapted for grease or oil lubrication.

While certain specific illustrations of various types of bearing constructions are disclosed in this specification, it is also within the scope of this invention to broadly cover a bearing construction in which either or both of the members which move relatively to each other, i. e. the bushing or the journal portion of the spindle of a machine part, are made of the boron carbide material, as thus described.

The term "bearing" as used in this specification and in the appended claims is intended to be interpreted broadly as including such types of bearing constructions in which shaped surfaces, such as those having flat or curved portions, are adapted to contact with or fit the contour of the movable member. The expression is also intended to include such constructions as, for example, work rest shoes for use in steadying and supporting the work in grinding machines, supporting plates for knife edges, thread eyelets and jewel bearings on spinning spindles in textile machinery, contact points and anvils for precision calipering instruments and gauges where hard, wear-resisting points are necessary, and bearings for use in heated places under operating conditions which permit little or no lubrication, in which the high refractoriness and inherent hardness of the carbide material make it particularly well suited.

It, moreover, is to be understood that while this invention is limited to a single phase, crystalline, self-bonded material formed under pressure in a semi-plastic or molten condition and consisting of upwards of 90% of boron carbide in a crystalline form and without cementing materials, it is the intention that the claims cover such alterations and additions of other materials that may be made to modify the crystallinity or produce various slightly altered characteristics in the particular carbide material used as may be reasonably included within the scope of this invention.

The expression "continuous crystalline phase", as found in the claims, is not intended to limit this case to any particular theory of formation of the body, nor as to the physical condition of the final product. It is immaterial in so far as this invention is concerned whether the individual grains of boron carbide have melted completely during the pressure casting operation and then have crystallized into a single homogeneous body, or whether the individual grains have not been wholly melted but have been merely softened and molded together into an integral body, or have become recrystallized without melting. The expression is, however, intended to cover a body which is substantially devoid of parting planes of graphite and of any large amount of other impurities which can seriously interfere with the homogeneity and integrality of the body, and with its function for the purposes herein described.

Having thus described the invention, what is claimed as new and desired to secure by Letters Patent is:

1. A bearing comprising a molded body of the required dimensions and shape which is composed of boron carbide of the formula $B_4C$.

2. A bearing member comprising a body of boron carbide having a substantially continuous phase and a composition conforming substantially to the formula $B_4C$ which has been molded to the required dimensions and shape and is substantially free from parting planes of graphite and structure weakening impurities.

3. A bearing for a rotatable spindle comprising a body of required shape and dimensions, the bearing portion of which is composed of boron carbide granules of the formula $B_4C$ compacted into a dense, coherent mass, and in which the structure of said body is made up of a single, hard constituent having a substantially continuous crystalline phase which is devoid of graphite and other impurities and being substantially free from cementing materials of a low degree of hardness.

4. A bearing comprising a body of boron carbide molded to the required dimensions and shape and having a polished bearing surface, said boron carbide having a composition conforming substantially to the formula $B_4C$ and being substantially free from parting planes of graphite and structure weakening impurities and having a density above 2.3 and a modulus of rupture in compression in excess of 100,000 pounds per square inch.

5. A bearing for a rotatable spindle comprising an inner bearing portion of boron carbide having a substantially continuous phase and a composition conforming substantially to the formula $B_4C$ which has been molded to the required dimensions and shape and is substantially free from parting planes of graphite and structure weakening impurities, and an outer metal support substantially integral therewith which reinforces the boron carbide bearing portion against stresses arising during its use.

RAYMOND R. RIDGWAY.
BRUCE L. BAILEY.